Patented Mar. 19, 1946

2,396,788

UNITED STATES PATENT OFFICE 2,396,788

REACTION AND PRODUCTS THEREFROM

William A. Hoffman, Wilmington, Del., assignor to E. I. du Pont de Nemours & Company, Wilmington, Del., a corporation of Delaware No Drawing. Application February 6, 1942, Serial No. 429,833

11 Claims. (Cl. 260—609)

This invention relates to reaction products of sulfur monochloride and certain halogenated ethylenes.

Efforts have been made to react sulfur monochloride with halogenated olefins having a plurality of halogen atoms on doubly bonded carbons but without success. Thus, no reaction takes place between trichloroethylene and sulfur monochloride even upon prolonged boiling of the reactants. (Pope and Smith, J. Chem. Soc. 119 396 (1921). Likewise no reaction is observed between sulfur monochloride and sym.-dichloroethylene at room temperature.

This invention has as an object a process for the preparation of reaction products of sulfur monochloride and certain halogenated ethylenes. A further object of this invention comprises new and useful reaction products from sulfur monochloride and certain halogenated ethylenes by the above process. Other objects will appear hereinafter.

These objects are accomplished by the following invention wherein sulfur monochloride is reacted with an ethylenically unsaturated organic compound wherein the ethylenic double bond is positioned between the first and second carbons of the chain, which carbons bear a plurality of halogen atoms, and at least one of which carbons bears a hydrogen, by bringing the same in contact in the presence of a catalyst.

The preferred method of carrying out the process of this invention consists in introducing the ethylenic compound into the sulfur monochloride containing the catalytic agent, preferably aluminum chloride, and maintained at atmospheric pressure and at a temperature below the boiling point of the reactants, i. e., in the liquid phase. The product is conveniently isolated by distillation under reduced pressure during which operation dehydrohalogenation occurs.

The more detailed practice of the invention is illustrated by the following examples, wherein parts given are by weight. There are of course many forms of the invention other than these specific embodiments.

Example I

Trichloroethylene (158 parts) was added dropwise with rapid stirring into a mixture of sulfur monochloride (81 parts) and aluminum chloride (2.0 parts) at a temperature of 30° C. As the reaction proceeded, considerable heat was evolved and cooling of the reaction flask was necessary. When the addition was complete, the product, a red oil, was washed with water and dried over calcium chloride. Upon distillation under reduced pressure, hydrogen chloride was eliminated and there was collected 173 parts of a red liquid which distilled at 185°–187° C./10 mm. The empirical formula for this material based upon a chlorine analysist of 72.5% closely approximates bis-(trichlorovinyl) sulfide—$C_4Cl_6S$ (calculated 72.7% chlorine). This compound exemplifies the novel products of this invention, i. e., the bis(polyhalovinyl) sulfides and particularly the bis(polychlorovinyl) sulfides. The corresponding halogen compounds may be made by suitable selection of the polyhaloethylenes. Trichloroethylene and sulfur monochloride did not react when refluxed together (without the catalyst) for 30 hours as evidenced by recovery of starting materials in quantitative yield.

Example II

Sym.-dichloroethylene (145 parts) was added dropwise into a well-stirred mixture of sulfur monochloride (100 parts) and aluminum chloride (2.0 parts) at room temperature over a period of 2 hours. When the reaction was complete, as evidenced by cessation of heat evolution, the mixture was washed with water and dried over calcium chloride. The crude product was a dark red oil. Elimination of hydrogen chloride occurred during the distillation of the product yielding 170 parts of a red liquid, boiling at 190° at a pressure of 10 mm. of mercury. The product contained 67% chlorine which approximates the empirical formula $C_4H_3Cl_5S$. (Calculated 68% chlorine). Sym.-dichloroethylene and sulfur monochloride did not react (without the catalyst) when allowed to stand together at room temperature for five hours.

The process of the present invention may be applied to any open chain halogenated hydrocarbon having a double bond between the first and second carbons of the chain, having a plurality of halogen atoms on said ethylenically bonded carbons and a hydrogen atom on at least one of said carbons including 1,2-dibromoethylene, 1-chloro-2-bromoethylene, 1,2-difluoroethylene, 1,2-diiodoethylene, 1,1-dichloroethylene, 1,2,3 - trichloropropene, 1,1 - dichloropropene-1, 1,2 - dichlorhexene-1, 1,2-dichloropropene-1, 1-fluoro-2-bromoethylene, 1,2-dibromopropene - 1, 1,1,2 - trifluoroethylene, 1,1,2 - tribromomoethylene, 1,1-dichloro-2-iodoethylene.

The preferred ethylenic compounds are those carrying chlorine atoms on the double bonded carbon atoms because of the combined features of greater reactivity, favorable physical properties and ease of operation.

Preferred proportions are two molecular equivalents of ethylenic compound to one molecular equivalent of sulfur monochloride. Excess of one or the other may be used, in which case it is desirable to use an excess, e. g., 3 to 1 or 4 to 1 of the ethylenic compound as this can more readily be removed from the reaction product by flash distillation.

The preferred catalyst in this process is aluminum chloride because of its great activity and because of the rapidity with which the reaction may be accomplished in the presence of this agent. However, any Friedel-Crafts' reaction catalyst may be employed including sulfuric acid, metallic aluminum plus mercuric chloride, bismuth chloride, chromium chloride, ferric bromide, zinc bromide, boron trifluoride, aluminum bromide, zinc chloride and ferric chloride.

It is convenient and preferable to effect contact between the reactants at ordinary temperature. However, the reaction may be carried out at somewhat elevated temperatures up to the boiling points of the reactants without the use of pressure vessels. There is little, if any, advantage in carrying out the reaction at higher temperatures and at pressures greater than atmospheric. In fact, the carrying out of the reaction at considerably elevated temperature 175-200° C. leads to considerable degradation of reaction products.

The preferred method of isolation of the reaction products is by distillation under reduced pressure during which operation dehydrohalogenation occurs. It is also possible, and, in some cases, desirable to utilize the product prior to distillation. In this way a produce may be obtained which contains a substantially higher percentage of halogen than the distilled product.

The process of this invention is applicable to polyhalogenated ethylenes in which a plurality of halogen atoms are carried on the doubly bonded carbons, whereas prior processes operate only with ethylene, its homologs, and monohalogenated ethylenes. Thus it is possible to obtain highly halogenated products from readily available halogenated ethylenic compounds. Moreover, in the catalytic process described above, reaction can be effected rapidly and at conveniently low temperatures.

The products of the process of this invention may be used as rubber chemicals, weed killing agents, insecticides, lachrymatory agents and vesicants. The preferred di-polyhalogenated vinyl sulfides can be converted into useful materials by addition of halogens such as chlorine and bromine or by reaction with polysulfides.

The above description and examples are intended to be illustrative only. Any modification of or variation therefrom which conforms to the spirit of the invention is intended to be included within the scope of the claims.

What is claimed is:

1. Process which comprises bringing trichloroethylene in contact in the liquid state with aluminum chloride and sulfur monochloride.

2. Process which comprises bringing a chlorinated ethylene having at least one chlorine on each carbon and at least one hydrogen on one carbon in contact with aluminum chloride and sulfur monochloride in the liquid phase.

3. Process which comprises bringing a halogenated ethylene having a plurality of halogen atoms on the doubly bonded carbons and at least one hydrogen on one of said carbons in contact with aluminum chloride and sulfur monochloride in the liquid phase.

4. Process which comprises bringing a chlorinated open chain olefin having at least two chlorine atoms on the doubly bonded carbons and a hydrogen atom on at least one of said carbons, in contact with aluminum chloride and sulfur monochloride in the liquid phase.

5. Process which comprises bringing a halogenated open chain olefin having a plurality of halogen atoms on the doubly bonded carbons and a hydrogen atom on at least one of said carbons, in contact with aluminum chloride and sulfur monochloride in the liquid phase.

6. Process which comprises bringing symmetrical dichloroethylene in contact in the liquid state with aluminum chloride and sulfur monochloride.

7. Process which comprises bringing a halogenated open chain olefin having at least two halogen atoms on the doubly bonded carbons and a hydrogen atom on at least one of said carbons, in contact in the liquid phase at atmospheric pressure with sulfur monochloride and a Friedel-Crafts' catalyst.

8. A bis(polyhalovinyl) sulfide.

9. A bis(polychlorovinyl) sulfide.

10. Bis(trichlorovinyl) sulfide.

11. Process which comprises bringing a halogenated open chain olefin having at least two halogen atoms on the doubly bonded carbons and a hydrogen atom on at least one of said carbons, in contact with sulfur monochloride and a Friedel-Crafts' catalyst.

WILLIAM A. HOFFMAN.